April 20, 1926. 1,581,670

J. D. BOLENDER ET AL

MOLDING FOR AUTOMOBILE TOPS

Filed Feb. 11, 1924

Inventors
Joel D. Bolender
and Edgar R. Cramer
By
Attorneys

Patented Apr. 20, 1926.

1,581,670

UNITED STATES PATENT OFFICE.

JOEL D. BOLENDER AND EDGAR R. CREAMER, OF CONNERSVILLE, INDIANA, ASSIGNORS TO THE GEORGE R. CARTER COMPANY, OF CONNERSVILLE, INDIANA, A CORPORATION OF INDIANA.

MOLDING FOR AUTOMOBILE TOPS.

Application filed February 11, 1924. Serial No. 691,914.

*To all whom it may concern:*

Be it known that we, JOEL D. BOLENDER and EDGAR R. CREAMER, citizens of the United States, residing at Connersville, in the county of Fayette and State of Indiana, have invented certain new and useful Improvements in Moldings for Automobile Tops, of which the following is a specification.

This invention relates to improvements in molding for automobile tops, it more particularly relating to molding of the drip type, that is, molding so constructed as to provide a trough or gutter to convey the rain to the front or rear of the top.

Heretofore it has been common practice to place drip molding about the edge of the top or deck of the closed body of the motor vehicle, which molding is usually constructed of material having little flexibility such as metal.

One of the objects of this invention is to provide a molding which possesses great flexibility so as to enable it to conform readily to bends or curves about the tops of closed tops.

A further object of the invention is to provide a molding of the character referred to which may be conveniently covered with the same material with which the deck is covered and also which can be conveniently put up in continuous lengths of say approximately one hundred feet to the piece to eliminate wastage.

Another object and advantage of the invention is to provide a molding of flexible material which is constructed with a plurality of beads one at each side, one of which beads is so formed as to provide a gutter or trough for the drippings and the other bead being so arranged as to be folded and held in folded position after the fastening devices have been applied for the purpose of concealing such fastening devices and to form in effect a continuation of the inner vertical wall of the trough.

Referring to the drawings.

Figure 1:
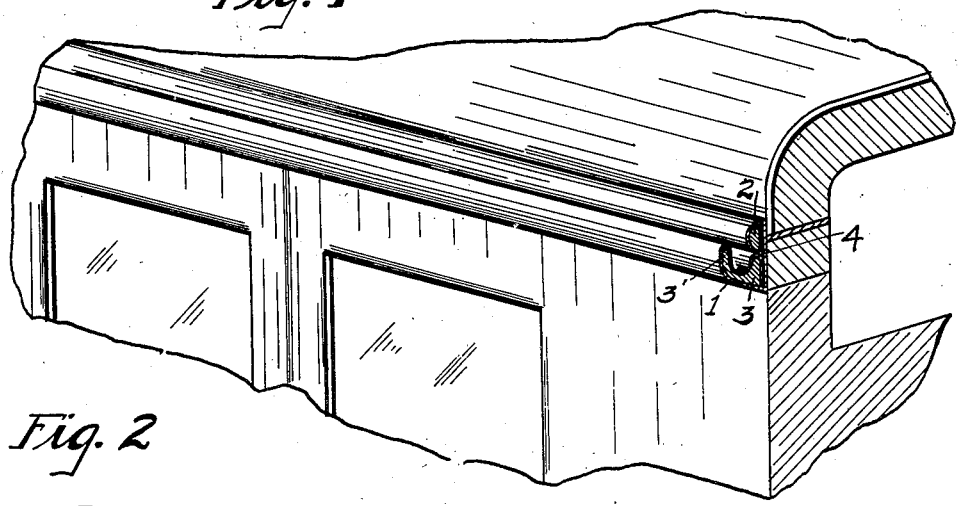
Fig. 1 is a perspective view partly in section of a portion of a closed automobile body showing the improved molding applied thereto in finished state.
Figure 2:
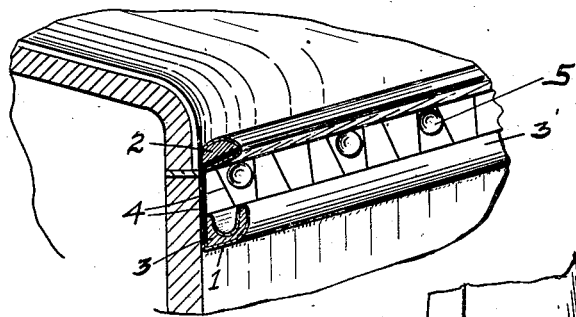
Fig. 2 is also a perspective view partly in section of a portion of the body showing the molding applied thereto before the bead which conceals the fastening devices has been folded to position.
Figure 3:
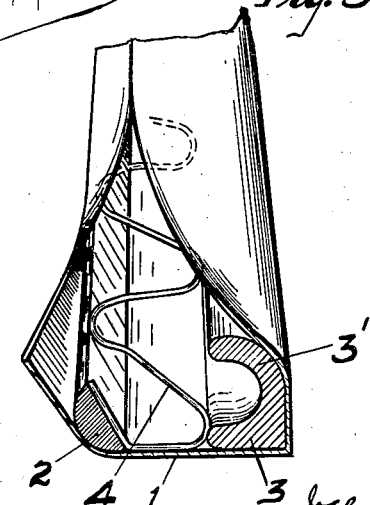
Fig. 3 is a perspective view of a section of the molding showing the parts thereof in partly assembled position.
Figure 4:
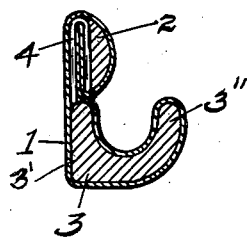
Fig. 4 is a vertical section of the molding.

The molding constituting the invention consists of a strip 1 of leather, fabric or other suitable material, a bead member 2, a gutter member 3, and a wire 4 bent in zigzag fashion. The bead 2 is preferably constructed of leather and is preferably rounded on one side and flat on the other. The member 3 is also constructed of flexible material, of sufficient rigidity to hold its shape, vulcanized rubber compound being found suitable, and consists of a vertical inner wall having a flat outer face 3' and a gutter or trough-like extension 3''. The wire 4, bent to zig-zag form as shown is laid on the leather fabric 1 between the two members and also upon the flat surface of the bead 2 and the covering then folded over the members 2 and 3 and the wire secured in position preferably by gluing, the two members being spaced apart a distance at least equal to the width of the bead 2. In applying the molding to the body, tacks 5, or other suitable similar fastening devices, are employed which are driven through that portion of the molding between the two beads, as shown in Fig. 2, after which the bead 2 is bent over the fastening devices so as to conceal the same, the outer face of the bead forming in effect a continuation of the vertical back wall of the trough. In folding the bead 2 the turns of the wire 4 are likewise folded, this wire serving to hold the bead 2 in its folded position.

A molding thus constructed affords great flexibility which can be readily bent about the curves and turns of the body at the edge of the deck and the covering 1 may be of the same material as the covering of the deck so as to provide a perfect match. Also, this type of molding can be furnished in long lengths of approximately one hundred feet or more to the piece, so as to eliminate wastage.

Having thus described our invention, we claim:

A molding of the character described, comprising a strip of flexible material, a folding bead of flexible material encased by the upper longitudinal portion of said strip to fold down upon the central portion thereof and conceal fastening devices, a flexible gutter or trough encased by the lower longitudinal portion of said strip and projecting outwardly beyond the said bead with its rear wall lying directly below the lower edge of the bead when the latter is folded.

In testimony whereof, we have hereunto set our hands this 2nd day of February 1924.

JOEL D. BOLENDER.
EDGAR R. CREAMER.